US012792411B2

(12) United States Patent
Li et al.

(10) Patent No.: US 12,792,411 B2
(45) Date of Patent: Nov. 10, 2026

(54) METHOD AND DEVICE FOR GENERATING DATA FLOW POLICY

(71) Applicant: Alibaba (China) Co., Ltd., Hangzhou (CN)

(72) Inventors: Haoran Li, Shanghai (CN); Fei Xue, Sunnyvale, CA (US); Ruiguang Zhong, Shanghai (CN); Yuan Gao, Shanghai (CN); Yuanwei Fang, Sunnyvale, CA (US); Peiye Liu, Beijing (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 314 days.

(21) Appl. No.: 18/606,882

(22) Filed: Mar. 15, 2024

(65) Prior Publication Data

US 2024/0311196 A1 Sep. 19, 2024

(30) Foreign Application Priority Data

Mar. 16, 2023 (CN) ........................ 202310277121.X

(51) Int. Cl.
*G06F 9/50* (2006.01)

(52) U.S. Cl.
CPC .......... *G06F 9/5038* (2013.01); *G06F 9/5044* (2013.01); *G06F 2209/501* (2013.01)

(58) Field of Classification Search
None
See application file for complete search history.

(56) References Cited

U.S. PATENT DOCUMENTS

2013/0194928 A1* 8/2013 Iqbal ........................ H04L 47/83 370/235
2014/0330807 A1* 11/2014 Weyerhaeuser .... G06F 16/9038 707/717
2016/0350146 A1* 12/2016 Udupi ................. G06F 9/45558
2018/0189231 A1* 7/2018 Fleming, Jr. ........ G06F 12/0842
(Continued)

FOREIGN PATENT DOCUMENTS

CN 113760394 A 12/2021
CN 114186633 A 3/2022
(Continued)

OTHER PUBLICATIONS

Liu et al.; "Data-flow Graph Mapping Optimization for CGRA with Deep Reinforcement Learning" IEEE 2019; DOI: 10.1109/TCAD.2018.2878183 (Liu_2019.pdf) (Year: 2019).*
(Continued)

*Primary Examiner* — Hiren P Patel
(74) *Attorney, Agent, or Firm* — Finnegan, Henderson, Farabow, Garrett & Dunner, LLP

(57) ABSTRACT

Some embodiments of this disclosure provide a method and an apparatus for generating a data flow policy. For example, a method for generating a data flow policy includes: obtaining a computational graph corresponding to a data processing task; generating an inter-stage data flow policy based on the computational graph and an execution cost; generating a plurality of intra-stage data flow policies corresponding to the plurality of pipeline stages based on the inter-stage data flow policy; and updating the execution cost based on the plurality of intra-stage data flow policies.

20 Claims, 11 Drawing Sheets

100

(56) References Cited

U.S. PATENT DOCUMENTS

| | | | | |
|---|---|---|---|---|
| 2019/0036828 | A1* | 1/2019 | Bajaj | H04L 41/40 |
| 2019/0114535 | A1* | 4/2019 | Ng | G06N 3/0464 |
| 2019/0228340 | A1* | 7/2019 | Nicol | G06F 9/345 |
| 2021/0373957 | A1* | 12/2021 | Tovey | G06T 15/005 |
| 2022/0109701 | A1* | 4/2022 | Zeng | H04L 41/0894 |
| 2022/0269548 | A1* | 8/2022 | Dwivedi | G06F 11/3006 |
| 2022/0318652 | A1* | 10/2022 | Wei | G06F 16/24549 |
| 2024/0045673 | A1* | 2/2024 | Bahirat | G06F 9/3001 |
| 2024/0311193 | A1* | 9/2024 | Li | G06F 9/50 |

FOREIGN PATENT DOCUMENTS

| | | | |
|---|---|---|---|
| CN | 115543639 | A | 12/2022 |
| WO | 2022012123 | A1 | 1/2022 |

OTHER PUBLICATIONS

Dai Peng, "Physics-Based Rendering Simulation Network Based on Deep Learning", published Jul. 15, 2020.

Chinese Search Report and Chinese 1st Office Action, corresponding with a Chinese Application No. 202310277121X ,mailed on Jun. 25, 2026, 2023. (3 pages for CNSR and 5 pages for CNOA respectively).

* cited by examiner

200

METHOD AND DEVICE FOR GENERATING DATA FLOW POLICY

CROSS-REFERENCE TO RELATED APPLICATIONS

The disclosure claims the benefits of priority to Chinese Application No. 202310277121.X, filed on Mar. 16, 2023, which is incorporated herein by reference in its entirety.

TECHNICAL FIELD

Embodiments of this disclosure relate to the technical field of artificial intelligence, and in particular, to methods and devices for generating a data flow policy.

BACKGROUND

A data flow architecture is a new computing architecture that can perform spatial and temporal computation by using a multi-core architecture. Compared with shared-memory architectures such as a central processing unit (CPU) and a graphics processing unit (GPU), the data flow architecture clearly splits a task into micro tasks and maps the micro tasks into a plurality of processing elements (also referred to as Process Element, and simplified as PE), and clearly orchestrates data movement between the PEs. In some scenarios, the data flow architecture can achieve a higher system utilization, energy efficiency, model capacity, and the like than the shared-memory architectures. Therefore, the data flow architecture is applicable to deep learning tasks such as training and inference of a neural network model.

During optimization of the data flow architecture, a data flow policy needs to be constructed to map the computational graph to hardware based on the data flow policy. Currently, during optimization of the data flow architecture, the data flow policy is manually constructed. A plurality of operators included in the computational graph are manually partitioned, and the partitioned operators are mapped to specific hardware.

However, optimizing the data flow architecture through manual construction of the data flow policies requires manual operation and professional knowledge, which cannot be generalized to different data processing tasks and hardware, and therefore has poor applicability.

SUMMARY

The disclosed embodiments of this disclosure provide a method and an apparatus for generating a data flow policy, an electronic device, and a storage medium, to at least resolve or relieve the above problem.

According to some embodiments of this disclosure, a method for generating a data flow policy is provided. The method includes: obtaining a computational graph corresponding to a data processing task; generating an inter-stage data flow policy based on the computational graph and an execution cost, wherein the inter-stage data flow policy includes a policy of assigning operators included in the computational graph to a plurality of pipeline stages, and each of the plurality of pipeline stages includes at least one operator; generating a plurality of intra-stage data flow policies corresponding to the plurality of pipeline stages based on the inter-stage data flow policy; and updating the execution cost based on the plurality of intra-stage data flow policies, to optimize the inter-stage data flow policy and obtain a target inter-stage data flow policy and a plurality of corresponding target intra-stage data flow policies for executing the data processing task.

According to some embodiments of this disclosure, an apparatus for generating a data flow policy is provided. The apparatus includes: an obtaining unit configured to obtain a computational graph corresponding to a data processing task; a first generation unit configured to generate an inter-stage data flow policy based on the computational graph and an execution cost, wherein the inter-stage data flow policy includes a policy of assigning operators included in the computational graph to a plurality of pipeline stages, and each of the pipeline stages includes at least one operator; a second generation unit configured to generate a plurality of intra-stage data flow policies corresponding to the plurality of pipeline stages based on the inter-stage data flow policy; and an updating unit configured to update the execution cost based on the plurality of intra-stage data flow policies, to optimize the inter-stage data flow policy and obtain a target inter-stage data flow policy and a plurality of corresponding target intra-stage data flow policies for executing the data processing task.

According to some embodiments of this disclosure, an electronic device is provided, including one or more processors, a memory, a communication interface, and a communication bus. The one or more processors, the memory, and the communication interface are configured to communicate with each other through the communication bus, and the memory is further configured to store instructions that are executable by the one or more processors to cause the electronic device to perform operations corresponding to any of the methods described herein.

According to some embodiments of this disclosure, a non-transitory computer-readable storage medium is provided. The non-transitory computer-readable storage medium stores instructions that are executable by one or more processors of a device to cause the device to perform operations corresponding to any of the methods described herein.

According to some embodiments of this disclosure, a computer program product is provided, including computer instructions. The computer instructions instruct a computing device to perform any of the methods described herein.

BRIEF DESCRIPTION OF THE DRAWINGS

The accompanying drawings described herein are used for providing a further understanding of the present disclosure, and forming a part of the present disclosure. Exemplary examples of the present disclosure and descriptions thereof are used for explaining the present disclosure, but do not constitute any inappropriate limitation to the present disclosure. In the accompanying drawings.

DETAILED DESCRIPTION

Figure 1:
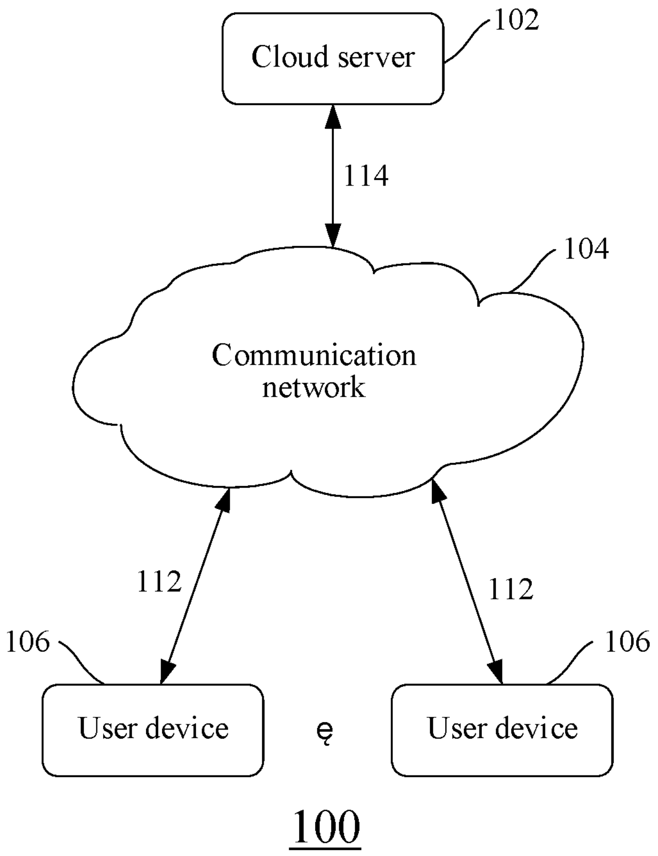
FIG. 1 is a schematic diagram of an exemplary system according to some embodiments of this disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

According to the solution for generating a data flow policy provided in some embodiments of this disclosure, the data flow policy includes the inter-stage data flow policy and the plurality of intra-stage data flow policies, the inter-stage data flow policy may be determined based on the computational graph and the execution cost, the intra-stage data flow policies may be determined based on the inter-stage data flow policy, the execution cost may be updated based on the intra-stage data flow policies to achieve optimization of the inter-stage data flow policy, and new intra-stage data flow policies may be generated based on the optimized inter-stage data flow policy. The data flow policy for the data processing task may be obtained by repeating the above optimization process. The data flow policy includes the target inter-stage data flow policy and the plurality of corresponding target intra-stage data flow policies. In this way, automated generation of the data flow policy is achieved. The data flow policy is applicable to different data processing tasks and hardware resources, and has high applicability.

Some embodiments of this disclosure provide a solution for generating a data flow policy. The solution for generating a data flow policy can be universal and is applicable to various hardware devices that adopt a data flow architecture, such as a data center, a server, a personal computer, an Internet of Things (IoT) device, and an embedded device. The solution for generating a data flow policy can be independent of hardware deployed in a computing device that executes the solution.

In some embodiments of the present disclosure, data flow architecture is a computing architecture different from shared-memory architectures such as a CPU and a GPU, which performs spatial and temporal computation by using a multi-core architecture. It splits data and a task into micro tasks and maps the tasks to a plurality of processing elements (PEs), and orchestrates data movement between the PEs.

In some embodiments of the present disclosure, PE is a basic computation block in a data flow architecture, which is connected through a network on chip (NoC).

In some embodiments of the present disclosure, NoC is a new communication method for a system on chip (SoC). The NoC connects a plurality of nodes on a chip together, to enable reliable communication between the nodes. A topology that may be formed by the nodes included in the NoC includes a 2D/3D mesh network, a torus network, a ring network, and the like.

In some embodiments of the present disclosure, data flow policy is a universal policy including splitting a computational graph, splitting an operator into micro operators, segmenting a tensor into micro tensors, and mapping the micro operators to PEs.

FIG. 1 is a schematic diagram of an exemplary system 100 according to some embodiments of this disclosure, wherein system 100 can be applicable to a method for generating a data flow policy according to some embodiments of this disclosure. As shown in FIG. 1, system 100 may include a cloud server 102, a communication network 104, and at least one user device 106. FIG. 1 exemplifies a plurality of user devices 106. It is to be noted that the solution in some embodiments of this disclosure is applicable to either cloud server 102 or user device 106.

Cloud server 102 may be any proper device configured to store information, data, programs, and/or content of any other suitable type, which includes but is not limited to a distributed storage system device, a server cluster, and a computing cloud server cluster. In some embodiments, cloud server 102 may perform any proper function. For example, in some embodiments, cloud server 102 may be configured to generate a data flow policy for executing a data processing task through a data flow architecture. In some embodiments, cloud server 102 may generate the data flow policy for the data processing task, and execute the data processing task based on the data flow policy. In other embodiments, cloud server 102 may generate the data flow policy for the data processing task and send the generated data flow policy to user device 106. User device 106 executes the data processing task based on the data flow policy.

Communication network 104 may be any proper combination of one or more wired and/or wireless networks. For example, communication network 104 may include any one or more of the Internet, an intranet, a wide area network (WAN), a local area network (LAN), a wireless network, a digital subscriber line (DSL) network, a frame relay network, an asynchronous transfer mode (ATM) network, a virtual private network (VPN), and/or any other suitable communication network. User device 106 may be connected to communication network 104 through one or more communication links (for example, a communication link 112). Communication network 104 may be connected to cloud server 102 through one or more communication links (for example, a communication link 114). The communication link may be any communication link adapted for data transmission between cloud server 102 and user device 106, for example, a network link, a dial-up link, a wireless link, a hard-wired link, any other suitable communication link, or any proper combination of such links.

User device 106 may include any one or more user devices adapted for interaction. In some embodiments, when the data flow policy is to be generated by cloud server 102, user device 106 may send a policy generation request to cloud server 102, which includes relevant information of the data processing task, to trigger cloud server 102 to generate the data flow policy based on the request and feed back the generated data flow policy to user device 106. User device 106 may include any suitable type of device. For example, user device 106 may include a mobile device, a tablet computer, a laptop computer, a desktop computer, a wearable computer, a vehicle system, and/or any other suitable type of user device.

In some embodiments, in an exemplary system applicable to the method for generating a data flow policy in some embodiments of this disclosure, an upper computer and one or more accelerator cards may be included, which are connected to each other through a communication network such as a bus. The upper computer may generate the data flow policy for executing the data processing task through the data flow architecture, and schedule the accelerator card to execute the data processing task based on the data flow policy. The accelerator card includes an NoC including a plurality of PEs. The PEs within the same NoC communicate with each other through the NoC. Different accelerator cards communicate with each other through the Ethernet or the like. The upper computer may deploy the data flow policy to one accelerator card, or may deploy the data flow policy to a plurality of accelerator cards. The present disclosure is not limited by the manner in which the upper computer is defined.

Some embodiments of this disclosure mainly focus on a process of generating the data flow policy by cloud server 102 or the upper computer. The process of generating the data flow policy is described in detail below.

Based on the above system, some embodiments of this disclosure provide a method for generating a data flow policy. The method for generating a data flow policy is described in detail below through a plurality of embodiments.

Figure 2:
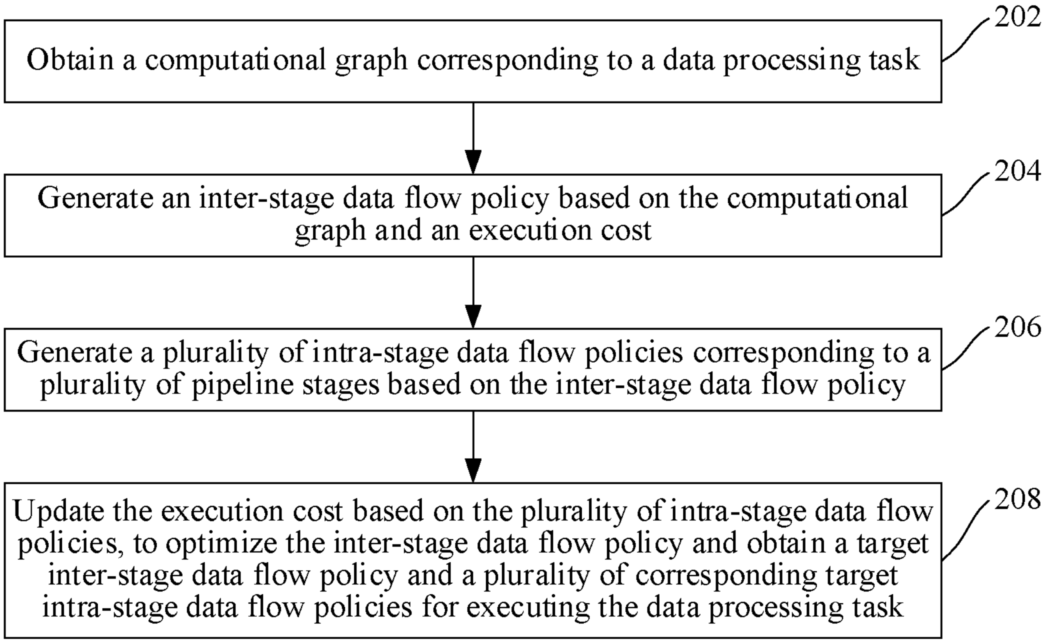
FIG. 2 is a flowchart of an exemplary method for generating a data flow policy according to some embodiments of this disclosure.

FIG. 2 is a flowchart of an exemplary method 200 for generating a data flow policy according to some embodiments of this disclosure. As shown in FIG. 2, method 200 for generating a data flow policy includes the following steps 202 to 208, which can be implemented by a cloud server (e.g., cloud server 102 in FIG. 1), for example.

In step 202, the cloud server obtains a computational graph corresponding to a data processing task.

In some embodiments of the present disclosure, computational graph is a directed graph representing a computing flow, and includes nodes and edges connecting the nodes. The nodes represent operators (OP) in the computing flow, and the edges connecting the nodes represent data or control dependency between two nodes connected to each other.

The computational graph represents a direction of a data flow during execution of the data processing task, and includes a plurality of operators represented by nodes. Connection lines between the nodes indicate that data or control dependency exists between the operators. The data dependency means that a post-order operator needs to be operated based on output data of a pre-order operator, and the control dependency means that the post-order operator needs to be operated after the pre-order operator outputs data. The operators are various operations required during execution of the data processing task, such as matrix multiplication and matrix addition.

The data processing task may be a training task for a neural network model or an inference task for the neural network model.

In step 204, the cloud server generates an inter-stage data flow policy based on the computational graph and an execution cost.

The execution cost is a cost for executing the data processing task based on the corresponding data flow policy, for example, may be a hardware resource or a time required for performing the data processing task. Because the generation of the data flow policy is an optimization process, the execution cost in a first round of generating the inter-stage data flow policy may be a preset value that has no or little impact on the generated inter-stage data flow policy. Starting from a second round of generating the inter-stage data flow policy, the execution cost may be determined based on the data flow policy generated in the previous round. In the process of optimizing the data flow policy, the execution cost may indicate whether requirements on a hardware resource and/or a time consumption are met during the execution of the data processing task based on the generated data flow policy.

To improve efficiency of data processing, operator parallel may be performed in various manners such as pipeline parallel, data parallel, or model parallel. The pipeline parallel means splitting a computational graph into a plurality of pipeline stages based on a data flow direction. A single pipeline stage includes one or more operators. Output data of a pre-order pipeline stage is used as input data of a post-order pipeline stage. A data processing procedure proceeds in a form of a pipeline. The data parallel means splitting data into input data for different operators, to implement parallel processing of data. Model parallel means parallel of a plurality of other operators that depend on a same operator based on a dependency between the operators.

In some embodiments of the present disclosure, data parallel is a common form of distributed training of deep learning models. To be specific, a training data sample is split into a plurality of parts, a same model parameter is replicated on different devices for training, and parameter gradients generated from the training are aggregated through a network to complete parameter updating.

Model parallel may assign different stages of an entire computational graph to different devices, or segment a single operator (data) for computation by a plurality of devices and for data exchange or aggregation at a specific location.

Figure 3:
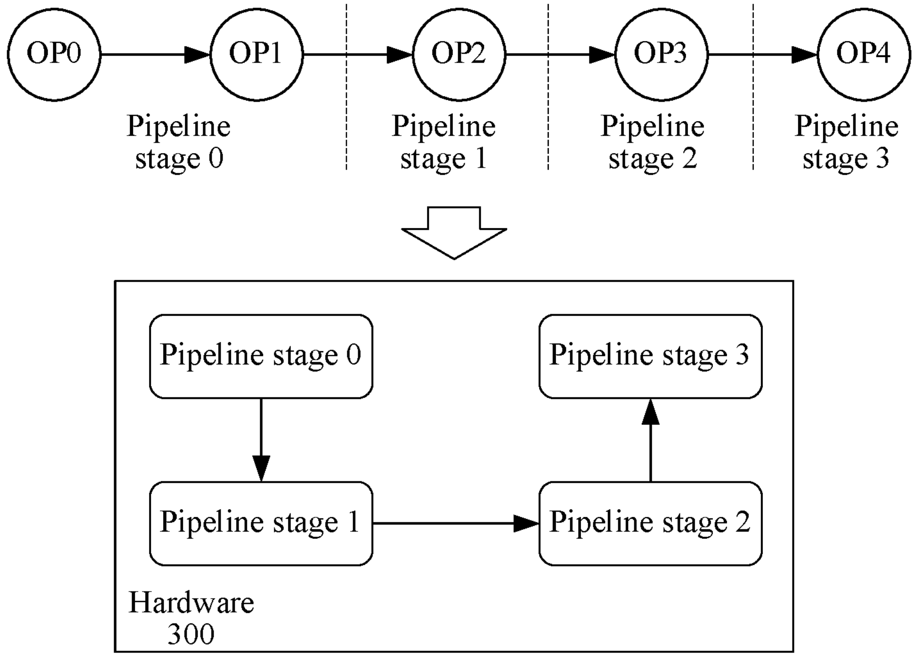
FIG. 3 is a schematic diagram illustrating pipeline parallel according to some embodiments of this disclosure.
Figure 4:
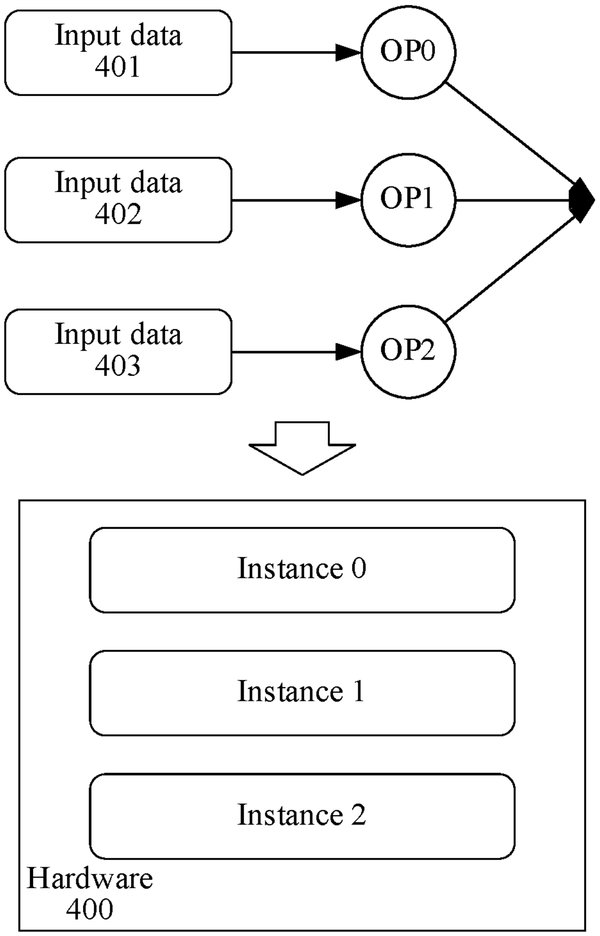
FIG. 4 is a schematic diagram illustrating data parallel according to some embodiments of this disclosure.
Figure 5:
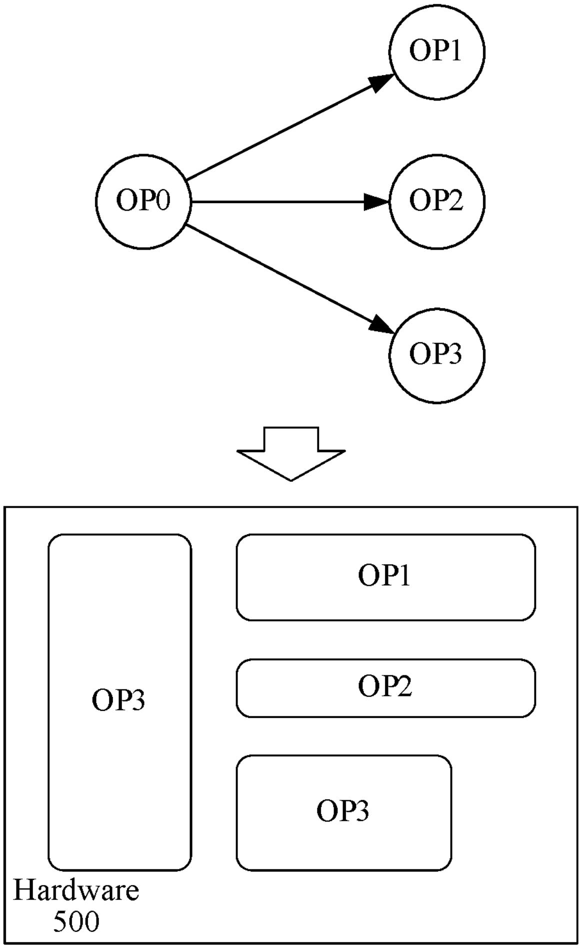
FIG. 5 is a schematic diagram illustrating model parallel according to some embodiments of this disclosure.

FIG. 3 is a schematic diagram illustrating pipeline parallel, FIG. 4 is a schematic diagram illustrating data parallel, and FIG. 5 is a schematic diagram illustrating model parallel, according to some embodiments of this disclosure.

As shown in FIG. 3, the computational graph includes OP0 to OP4. OP0 and OP1 are assigned to a pipeline stage 0, OP2 is assigned to a pipeline stage 1, OP3 is assigned to a pipeline stage 2, and OP4 is assigned to a pipeline stage 3. Different pipeline stages are mapped to different PEs of a hardware 300 to achieve pipeline parallel.

As shown in FIG. 4, the data to be processed is split into three pieces of input data 401, 402 and 403, which are respectively used as inputs of OP0, OP1, and OP2. Output data of OP0, OP1, and OP2 are aggregated to obtain a data processing result corresponding to the data to be processed. OP0 and the corresponding input data 401 are mapped to an instance 0 of a hardware 400, OP1 and the corresponding input data 402 are mapped to an instance 1 of hardware 400, and OP2 and the input data 403 are mapped to an instance 2 of hardware 400. Instance 0, instance 1, and instance 2 are executed in parallel to achieve data parallel.

As shown in FIG. 5, OP1, OP2, and OP3 have data or control dependency with OP0. OP0, OP1, OP2, and OP3 are respectively mapped to a hardware 500. After OP0 outputs data, OP1, OP2, and OP3 may be executed in parallel to achieve model parallel.

The inter-stage data flow policy includes a policy of assigning the operators included in the computational graph to a plurality of pipeline stages. To be specific, a plurality of operators included in the computational graph may be assigned to the plurality of pipeline stages based on the inter-stage data flow policy, so that each of the pipeline stages includes at least one operator. The data flow policy includes the inter-stage data flow policy. Based on the inter-stage data flow policy, the computational graph may be split into a plurality of pipeline stages. Each of the pipeline stages may process data through pipeline parallel.

Referring back to FIG. 2, in step 206, the cloud server generates a plurality of intra-stage data flow policies corresponding to the plurality of pipeline stages based on the inter-stage data flow policy.

Because the inter-stage data flow policy may determine the operators included in the pipeline stages, after the inter-stage data flow policy is generated, data processing manners within the pipeline stages may be determined based on the inter-stage data flow policy, thereby generating intra-stage data flow policies that may indicate implementation manners of the operators within the pipeline stages. The pipeline stages correspond to the intra-stage data flow policies. The intra-stage data flow policies may indicate the operator implementation manners within corresponding pipeline stages.

Still referring to FIG. 2, in step 208, the cloud server updates the execution cost based on the plurality of intra-stage data flow policies, to optimize the inter-stage data flow policy and obtain a target inter-stage data flow policy and a plurality of corresponding target intra-stage data flow policies for executing the data processing task.

After the plurality of intra-stage data flow policies are obtained, the execution cost may be updated based on each of the intra-stage data flow policies. In this case, step 204 and step 206 may be performed based on the updated execution cost, to generate a new inter-stage data flow policy, and new intra-stage data flow policies may be generated based on the new inter-stage data flow policy, thereby achieving optimization of the inter-stage data flow policy. After the optimization of the inter-stage data flow policy is completed and then the target inter-stage data flow policy is obtained, a plurality of intra-stage data flow policies corresponding to the target inter-stage data flow policy may be obtained, so that a data flow policy including the target inter-stage data flow policy and the target intra-stage data flow policies may be obtained. The data flow policy may be used for executing the data processing task.

The intra-stage data flow policies are determined based on the inter-stage data flow policy, and the inter-stage data flow policy is optimized based on the execution cost. Therefore, through optimization of the inter-stage data flow policy based on the execution cost, a target inter-stage data flow policy that meets requirements may be obtained, and a plurality of target intra-stage data flow policies corresponding to the target inter-stage data flow policy may be obtained, thereby obtaining the data flow policy including the target inter-stage data flow policy and the target intra-stage data flow policies for executing the data processing task.

In some embodiments of this disclosure, the data flow policy includes the inter-stage data flow policy and the plurality of intra-stage data flow policies, the inter-stage data flow policy may be determined based on the computational graph and the execution cost, the intra-stage data flow policies may be determined based on the inter-stage data flow policy. The execution cost may be updated based on the intra-stage data flow policies to achieve optimization of the inter-stage data flow policy, and new intra-stage data flow policies may be generated based on the optimized inter-stage data flow policy. The data flow policy for the data processing task may be obtained by repeating the above optimization process. The data flow policy includes the target inter-stage data flow policy and the plurality of corresponding target intra-stage data flow policies. In this way, automated generation of the data flow policy is achieved. The data flow policy is applicable to different data processing tasks and hardware resources, and has high applicability.

Through splitting of the data flow policy into the inter-stage data flow policy and the intra-stage data flow policies for optimization, the intra-stage data flow policies corresponding to the plurality of pipeline stages may be respectively determined, which reduces a search space for the intra-stage data flow policies, thereby shortening a time required for generating the data flow policy, and improving efficiency of generating the data flow policy.

In some embodiments, during the optimization of the inter-stage data flow policy, the execution cost may be updated based on the plurality of current intra-stage data flow policies, and it may be determined whether the updated execution cost meets an optimization termination condition. If the updated execution cost does not meet the optimization termination condition, step 204 and step 206 are re-performed based on the updated execution cost, to optimize the current inter-stage data flow policy. If the updated execution cost meets the optimization termination condition, the current inter-stage data flow policy and the plurality of corresponding intra-stage data flow policies are determined as the target inter-stage data flow policy and the plurality of corresponding target intra-stage data flow policies.

The execution cost may indicate whether the current inter-stage data flow policy and the plurality of corresponding intra-stage data flow policies meet the requirements for executing the data processing task. Therefore, the optimization termination condition may be determined based on the requirements for executing the data processing task, and then it may be determined whether the optimization of inter-stage data flow policy is completed based on a matching relationship between the execution cost and the optimization termination condition.

In some embodiments of this disclosure, after the plurality of corresponding intra-stage data flow policies are determined based on the inter-stage data flow policy, the execution cost may be updated based on the intra-stage data flow policies, and it is determined based on the matching relationship between the updated execution cost and the optimization termination condition whether to further optimize the inter-stage data flow policy. After the optimization is completed, the target inter-stage data flow policy and the plurality of corresponding target intra-stage data flow policies for executing the data processing task are obtained. The process of optimizing the inter-stage data flow policy is controlled based on the matching relationship between the execution cost and the optimization termination condition. Meanwhile, the execution cost is used as a basis for optimizing the inter-stage data flow policy, to ensure that the process of optimizing the inter-stage data flow policy can proceed smoothly and that the target inter-stage data flow policy can be quickly obtained, thereby improving the efficiency of generating the data flow policy.

In some embodiments, the optimization termination condition may be that the execution cost converges, or an execution time of the data processing task is less than a duration threshold.

The execution cost may indicate a cost for executing the data processing task based on the corresponding inter-stage data flow policy and the corresponding intra-stage data flow policies. During the optimization of the inter-stage data flow policy, the execution cost needs to be updated, to generate a new inter-stage data flow policy based on the updated execution cost. If the execution cost converges during the optimization of the inter-stage data flow policy, that is, the execution cost no longer changes or only changes slightly with the intra-stage data flow policies, it indicates that the cost for executing the data processing task based on the current inter-stage data flow policy and the corresponding intra-stage data flow policies reaches a relatively optimal state. In this case, the optimization of the inter-stage data flow policy may be terminated. Therefore, that the execution cost converges may be used as the optimization termination condition.

The intra-stage data flow policies are determined based on the inter-stage data flow policy. Through the optimization of the inter-stage data flow policy, more data processing processes in the pipeline stages may be performed in parallel, thereby reducing the execution time of the data processing task. During the optimization of the inter-stage data flow policy, if a time spent in executing the data processing task based on the current inter-stage data flow policy and the corresponding intra-stage data flow policies is less than a determined duration threshold, it indicates that the execution time of the data processing task is shortened to a level that meets the requirements. In this case, the inter-stage data flow policy may not need to be further optimized. Therefore, that the execution time of the data processing task is less than the duration threshold may be used as the optimization termination condition.

In some embodiments of this disclosure, if that the execution cost converges is used as the optimization termination condition, during the execution of the data processing task based on the obtained target inter-stage data flow policy and corresponding intra-stage data flow policies, the cost for executing the data processing task may be relatively low. If that the execution time of the data processing task is less than the duration threshold is used as the optimization termination condition, during the execution of the data processing task based on the obtained target inter-stage data flow policy and corresponding intra-stage data flow policies, the execution time of the data processing task can meet the requirements. Therefore, using that the execution cost converges or that the execution time of the data processing task is less than the duration threshold as the optimization termination condition can meet different requirements for executing the data processing task, and is applicable to different application scenarios, thereby improving applicability of the solution for generating a data flow policy.

In some embodiments, during the updating of the execution cost based on the plurality of current intra-stage data flow policies, a plurality of intra-stage execution costs corresponding to the plurality of current intra-stage data flow policies may be determined, to update the execution cost based on the plurality of intra-stage execution costs.

The intra-stage data flow policies may indicate data processing plans within the corresponding pipeline stages. Therefore, the intra-stage execution costs of the corresponding pipeline stages may be determined based on the intra-stage data flow policies. The intra-stage execution costs may indicate costs for data processing in the corresponding pipeline stages, such as a time consumption and a hardware resource consumption. The execution of the data processing task is achieved through comprehensive data processing within the pipeline stages. Therefore, the cost for executing the data processing task depends on the costs for the data processing in the pipeline stages. Because the execution cost indicates the cost for executing the data processing task based on the inter-stage data flow policy and the corresponding intra-stage data flow policies, the execution cost may be determined based on the intra-stage execution costs of the pipeline stages.

In an example, an intra-stage cost model and an inter-stage cost model are obtained in advance. The intra-stage data flow polices may be inputted into the intra-stage cost model, to calculate the intra-stage execution costs of the pipeline stages corresponding to the intra-stage data flow polices. The intra-stage execution costs of the pipeline stages may be inputted into the inter-stage cost model to calculate a new execution cost. During the calculation of the new execution cost through the inter-stage cost model, alternatively, the current execution cost and the intra-stage execution costs of the pipeline stages may be inputted into the inter-stage cost model to calculate the new execution cost.

In some embodiments of this disclosure, because the execution of the data processing task is achieved through the data processing of the plurality of pipeline stages, the intra-stage execution costs of the corresponding pipeline stages may be determined based on the intra-stage data flow polices. Then the new execution cost is determined based on the intra-stage execution costs of the pipeline stages, to obtain the updated execution cost. In this way, it can be ensured that the updated execution cost can accurately reflect the cost for executing the data processing task based on the current inter-stage data flow policy and the plurality of corresponding intra-stage data flow polices, thereby ensuring that the generated data flow policy adapts to the requirements for executing the data processing task.

In some embodiments, the execution cost includes a hardware resource and a task execution time. Correspondingly, the inter-stage data flow policy includes a policy of assigning the operators included in the computational graph into the plurality of pipeline stages, a policy of splitting the hardware resource into a plurality of PE groups, and a policy of mapping the plurality of pipeline stages to the plurality of PE groups. The pipeline stage includes at least one operator, and each of the PE groups includes at least one PE.

During the execution of the data processing task based on the pipeline architecture, the execution cost of the data processing task includes a hardware resource consumption and an execution time consumption. Generally, an amount of hardware resources used during the execution of the data processing task is negatively correlated with the execution time of the data processing task. Therefore, the inter-stage data flow policy may be optimized by using the hardware resource and the task execution time as the execution cost. The data flow policy including the target inter-stage data flow policy and the plurality of target intra-stage data flow policies is generated with a goal of reducing the hardware resource consumption or reducing the task execution time during the execution of the data processing task.

Figure 6:
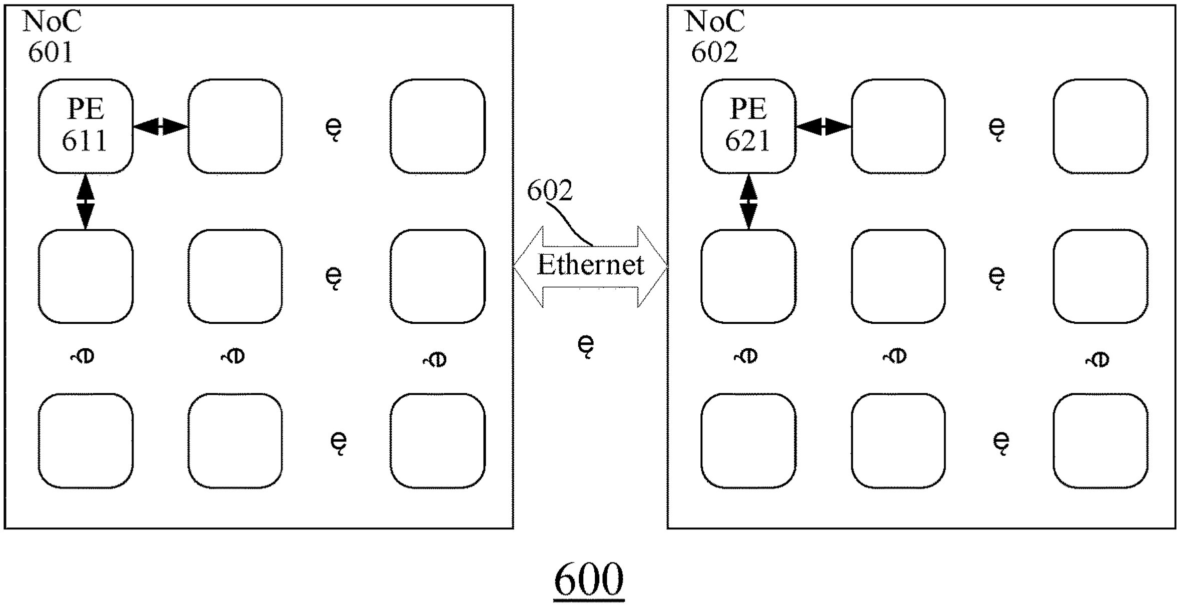
FIG. 6 is a schematic diagram of an exemplary hardware resource according to some embodiments of this disclosure.

The hardware resource for executing the data processing task includes a computing power of the PE, a bandwidth, a static random access memory (SRAM), a dynamic random access memory (DRAM), an NoC, and the like. The plurality of PEs included in the hardware resource include are connected through an NoC. FIG. 6 is a schematic diagram of an exemplary hardware resource 600 according to some embodiments of this disclosure. As shown in FIG. 6, hardware resource 600 includes a plurality of NoCs 601 and 602. Each of the NoCs 601 (602) may include a plurality of PEs 611 (612). The PEs 611 (612) within a same NoC 601 (602) can communicate with each other through the NoC 601 (602), and the PEs within different NoCs can communicate with each other through a communication network between the NoCs. The communication network between the NoCs may be, for example, an Ethernet 602.

When hardware resource 600 is split into a plurality of PE groups, each of the PE groups includes at least one PE. When the PE group includes a plurality of PEs, the PEs in a same PE group may be located within a same NoC or at least two different NoCs. Some embodiments of this disclosure are not limited by the manner in which the NoCs are arranged.

The PE group may be a wireless mesh network (a PE mesh). The PE mesh includes a plurality of PEs arranged in an array. The pipeline stages obtained by splitting may be mapped to the PE mesh, and the corresponding operators included in the pipeline stages may be executed through the PE mesh.

In some embodiments of this disclosure, a number and computing powers of the PEs included in the PE group depends on a policy of splitting the hardware resource, operators included in the pipeline stages depend on a policy of assigning the operators to the pipeline stages, and a correspondence between the pipeline stages and the PE groups depends on a policy of mapping the pipeline stages to the PE groups. During the execution of the data processing task, the operators included in the pipeline stages may be deployed to the PE groups corresponding to the pipeline stages, and the operators included in the pipeline stages are executed through the PEs included in the corresponding PE groups of the pipeline stages. The number and the computing powers of the PEs included in the PE groups affect a speed of executing the operators in the corresponding pipeline stages. Therefore, through generation of an inter-stage data flow policy including the policy of splitting the hardware resource, the policy of assigning the operators to the pipeline stages, and the policy of mapping the pipeline stages to the PE groups, available computing resources for the pipeline stages may be determined based on the inter-stage data flow policy, and therefore optimal intra-stage data flow policies corresponding to the pipeline stages may be determined, so that variable factors during the determination of the intra-stage data flow policies may be reduced, thereby shortening a time for determining the intra-stage data flow policies, and improving the efficiency of generating the data flow policy.

In some embodiments, at least one of the hardware resource and the task execution time included in the execution cost is an updatable item. In other words, during the updating of the execution cost based on the intra-stage data flow policies, at least one of the hardware resource and the task execution time may be updated.

The execution cost has three situations depending on whether the hardware resource and the task execution time are updatable items:

(i) The hardware resource is an updatable item, and the task execution time is a fixed item.

(ii) The hardware resource is a fixed item, and the task execution time is an updatable item.

(iii) The hardware resource and the task execution time are both updatable items.

For the above situation (i), during the updating of the execution cost based on the intra-stage data flow policies, the task execution time included in the execution cost remains unchanged, and only the hardware resource included in the execution cost is updated. This is suitable for a scenario in which hardware resources need to be reduced while the task execution time needs to be less than a target time. For example, the data processing task is to perform speech recognition through a speech recognition model. The speech recognition model is required to output a speech recognition result within 0.5 s after receiving inputted speech data, and no limitation is imposed on the hardware resource consumption. During generation of a data flow policy for the data processing task, the hardware resource consumption is increased or reduced based on a hardware resource consumption and a task execution time of the speech recognition performed based on a current inter-stage data flow policy and corresponding intra-stage data flow policies, and then a new inter-stage data flow policy is generated based on the updated hardware resource, to achieve updating of the inter-stage data flow policy and the corresponding intra-stage data flow policies, until a delay in outputting the speech recognition result is less than or equal to 0.5 while minimum hardware resources are used.

When the hardware resource is an updatable item and the task execution time is a fixed item, available hardware resources are updated based on the intra-stage data flow policies. If the task execution time is less than a target duration, the available hardware resources are reduced. If the task execution time is greater than the target duration, the available hardware resources are increased. The inter-stage data flow policy is optimized through updating of the hardware resource, until the task execution time of the data processing task, which is executed based on the inter-stage data flow policy and the corresponding intra-stage data flow polices, is less than the target duration and the hardware resource consumption converges. The inter-stage data flow policy and the plurality of corresponding intra-stage data flow policies at this time are determined as the target inter-stage data flow policy and the plurality of corresponding intra-stage data flow policies, to obtain a data flow policy including the target inter-stage data flow policy and the target intra-stage data flow policies, and apply the data flow policy to the execution of the data processing task.

For the above situation (ii), during the updating of the execution cost based on the intra-stage data flow policies, the hardware resource included in the execution cost remains unchanged, and only the task execution time included in the execution cost is updated. This is suitable for a scenario in which the task execution time needs to be reduced while the hardware resource is limited. For example, the data processing task is a task of training the speech recognition model, which is intended to minimize a time for training the model in a case that the allocatable hardware resources have been defined. During generation of a data flow policy for the model training task, the task execution time is increased or reduced based on a hardware resource consumption and a task execution time of model training performed based on a current inter-stage data flow policy and corresponding intra-stage data flow policies, and then a new inter-stage data flow policy is generated based on the updated task execution time, to achieve updating of the inter-stage data flow policy and the corresponding intra-stage data flow policies, until a time for training the model is minimal.

When the hardware resource is a fixed item and the task execution time is an updatable item, the task execution time is updated based on the intra-stage data flow policies, to achieve a goal of minimizing the task execution time. The inter-stage data flow policy is optimized through updating of the task execution time, until the task execution time of the data processing task, which is executed based on the inter-stage data flow policy and the corresponding intra-stage data flow polices, converges or is less than the target duration. The inter-stage data flow policy and the plurality of corresponding intra-stage data flow policies at this time are determined as the target inter-stage data flow policy and the plurality of intra-stage data flow policies, to obtain a data flow policy including the target inter-stage data flow policy and the target intra-stage data flow policies, and apply the data flow policy to the execution of the data processing task.

For the above situation (iii), during the updating of the execution cost based on the intra-stage data flow policies, the hardware resource and the task execution time included in the execution cost may be updated. This is suitable for a scenario in which neither of the task execution time and the hardware resource is limited. For example, the data processing task is the task of training the speech recognition model, which is intended to minimize a total cost of the model training task in a case that neither of the available hardware resource and the task execution time is limited. The total cost is determined based on a cost for the hardware resource consumption and a cost for the task execution time. During generation of a data flow policy for the model training task, at least one of the hardware resource consumption and the task execution time is increased or reduced based on a hardware resource consumption and a task execution time of model training performed based on a current inter-stage data flow policy and corresponding intra-stage data flow policies, and then a new inter-stage data flow policy is generated based on the updated hardware resource consumption and task execution time, to achieve updating of the inter-stage data flow policy and the corresponding intra-stage data flow policies, until the total cost for the model training task is minimal.

When the hardware resource and the task execution time are both updatable items, the hardware resource and the task execution time are updated based on the intra-stage data flow policies, to achieve a goal of minimizing a total cost for a to-be-processed task. The inter-stage data flow policy is optimized through updating of the hardware resource and the task execution time, until the total cost for executing the data processing task based on the inter-stage data flow policy and the corresponding intra-stage data flow polices is minimal or is less than a cost threshold. The inter-stage data flow policy and the plurality of corresponding intra-stage data flow policies at this time are determined as the target inter-stage data flow policy and the plurality of intra-stage data flow policies, to obtain a data flow policy including the target inter-stage data flow policy and the target intra-stage data flow policies, and apply the data flow policy to the execution of the data processing task.

In some embodiments of this disclosure, depending on the different functional application scenarios, at least one of the hardware resource and the task execution time included in the execution cost is an updatable item. In a scenario in which available hardware resources are fixed, the hardware resource is a fixed item and the task execution time is an updatable item. In a scenario in which the task execution time needs to be minimal or less than the target duration, the hardware resource is an updatable item and the task execution time is an updatable item. In a scenario in which the total cost for task execution needs to be minimal or less than the cost threshold, the hardware resource and the task execution time are both updatable items. In this way, the solution for generating a data flow policy provided in some embodiments of this disclosure is applicable to different application scenarios, thereby improving applicability of the solution for generating a data flow policy.

Figure 7:
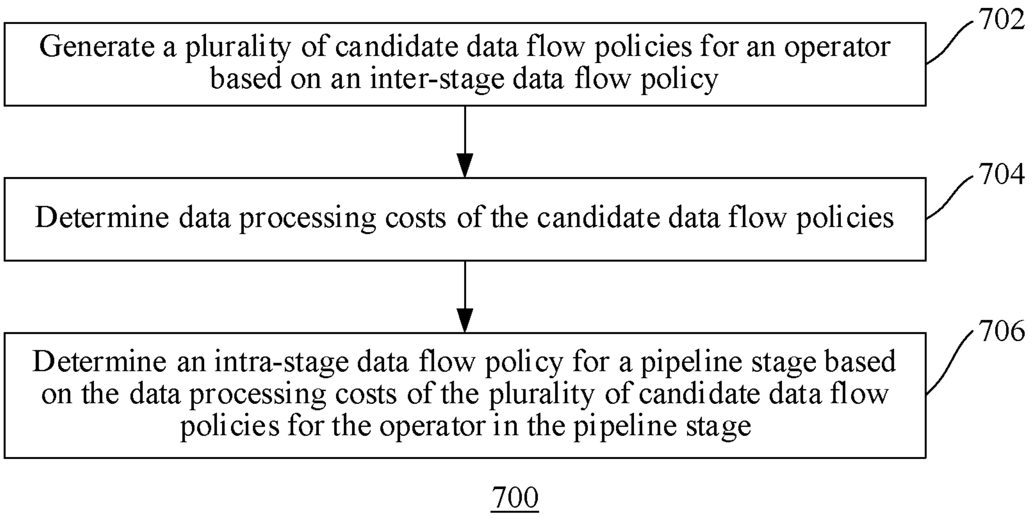
FIG. 7 is a flowchart of an exemplary method for generating an intra-stage data flow policy according to some embodiments of this disclosure.

FIG. 7 is a flowchart of an exemplary method 700 for generating an intra-stage data flow policy according to some embodiments of this disclosure. As shown in FIG. 7, method 700 for generating an intra-stage data flow policy includes the following steps 702 to 706, which can be implemented by a cloud server (e.g., cloud server 102 in FIG. 1), for example.

In step 702, the cloud server generates a plurality of candidate data flow policies for an operator based on an inter-stage data flow policy.

The inter-stage data flow policy can include a policy of assigning operators included in a computational graph to a plurality of pipeline stages. Each of the pipeline stages includes at least one operator. Therefore, the operator(s) included in the pipeline stages may be determined based on the inter-stage data flow policy, and an execution plan for the operator(s) in the pipeline stages may be determined based on a hardware resource allocated to the pipeline stages, to generate candidate data flow policies for the operator. The candidate data flow policies include splitting the operator into a plurality of micro operators, segmenting a tensor of the operator into a plurality of micro tensors, and the micro operators to PEs.

In some embodiments of the present disclosure, tensor is data transferred between PEs. A specific manifestation of the tensor is multidimensional data, such as a matrix or a vector.

Based on parallel solutions such as data parallel and model parallel, a plurality of execution solutions is provided for an operator. A plurality of candidate data flow policies corresponding to the operator may be generated for an operator based on the inter-stage data flow policy. In different candidate data flow policies, at least one of an operator splitting policy, a tensor segmenting policy, and a policy of mapping the micro operators to the PEs is different.

The tensor is input data of the operator. After the operator is split into a plurality of micro operators, the tensor needs to be segmented into a plurality of micro tensors for use as inputs of the corresponding micro operators, so as to ensure that a result of data processing through the micro operators obtained by splitting is the same as a result of data processing through the operator before splitting. During generation of the candidate data flow policies, the tensor segmenting policy may be determined first. After the tensor splitting policy is determined, a corresponding operator splitting policy may be determined, and then the policy of mapping the micro operators to the PEs may be determined.

The inter-stage data flow policy includes a policy of mapping the pipeline stages to a PE mesh. The PE mesh includes a plurality of PEs. After the operator splitting policy is determined, a policy of mapping the micro operators to the corresponding PEs in the PE mesh may be determined. One or more PEs execute the corresponding micro operator.

In step 704, the cloud server determines data processing costs of the candidate data flow policies.

A number of micro operators that may be executed in parallel depends on the operator splitting policy and the tensor segmenting policy, which affects data processing efficiency of the pipeline stage. A time required for data transmission between the PEs depends on the policy of mapping the micro operators to the PEs, which affects a data communication cost of the pipeline stage. The data processing efficiency and the communication cost of the pipeline stage both affect the data processing cost. Therefore, the data processing costs of the candidate data flow policies may be determined based on the operator splitting policy, the tensor segmenting policy, and the policy of mapping the micro operators to the PEs included in the candidate data flow policies.

In an example, relevant information of the candidate data flow policies may be inputted into a cost calculation model. The data processing costs of the candidate data flow policies may be calculated through the cost calculation model.

In step 706, the cloud server determines an intra-stage data flow policy for the pipeline stage based on the data processing costs of the plurality of candidate data flow policies for the operator in the pipeline stage.

An optimal candidate data flow policy may be selected from the plurality of candidate data flow policies for the operator based on the data processing costs corresponding to the plurality of candidate data flow policies for the operator. Then the intra-stage data flow policy for the pipeline stage may be determined based on the optimal candidate data flow policy for each operator in the pipeline stage. The pipeline stage includes one or more operators. If the pipeline stage includes one operator, an optimal candidate data flow policy for the operator may be used as the intra-stage data flow policy for the pipeline stage. If the pipeline stage includes a plurality of operators, optimal candidate data flow policies for the operators in the pipeline stage may be combined to obtain the intra-stage data flow policy for the pipeline stage.

In some embodiments of this disclosure, a plurality of candidate data flow policies may be generated for the operator included in the pipeline stage based on the inter-stage data flow policy, and the data processing costs of the candidate data flow policies may be determined. Then a combination of optimal candidate data flow policies may be found based on the data processing costs of the candidate data flow policies for use as the intra-stage data flow policy for the pipeline stage. Through generation of the data flow policy on an operator basis in the pipeline stage, the candidate data flow policies for each operator may be quickly determined. Then the optimal candidate data flow policies for the operators are combined to obtain the intra-stage data flow policy for the pipeline stage. In this way, efficiency of generating a data flow policy for executing a data processing task may be improved. Through generation of the plurality of candidate data flow policies for the operator and generation of the intra-stage data flow policy by filtering and combining the candidate data flow policies, a probability of obtaining a target inter-stage data flow policy and intra-stage data flow policies may be increased.

In some embodiments, during the determination of the intra-stage data flow policy based on the data processing costs of the candidate data flow policies, a plurality of candidate intra-stage data flow policies for the pipeline stage may be generated based on the operator included in the pipeline stage and the plurality of candidate data flow policies for the operator. Then the intra-stage data flow policy for the pipeline stage is determined from the plurality of candidate intra-stage data flow policies based on data communication costs of candidate data flow policies included in the candidate intra-stage data flow policies. Candidate data flow policies included in different candidate intra-stage data flow policies are at least partially different.

After the plurality of candidate data flow policies for each operator in the pipeline stage, the candidate data flow policies for the operators in the pipeline stage may be combined to obtain a plurality of candidate intra-stage data flow policies for the pipeline stage. Different candidate intra-stage data flow policies include at least one different candidate data flow policy. For example, the pipeline stage includes an operator 0, an operator 1, and an operator 2. Two candidate data flow policies are provided for the operator 0, three candidate data flow policies are provided for the operator 1, and four candidate data flow policies are provided for the operator 2. Through combination of the candidate data flow policies for the operator 0, the candidate data flow policies for the operator 1, and the candidate data flow policies for the operator 2, 2×3×4 candidate intra-stage data flow policies may be obtained.

An execution cost of the candidate intra-stage data flow policy depends on an execution cost of each operator included in the candidate intra-stage data flow policy, and the execution cost of the operator depends on the candidate data flow policies of the operator. Therefore, an intra-stage execution cost of each candidate intra-stage data flow policy may be determined based on the data processing cost of each candidate data flow policy included in the candidate intra-stage data flow policy. Then the intra-stage data flow policy for the pipeline stage may be selected from the candidate intra-stage data flow policies based on the intra-stage execution cost of each candidate intra-stage data flow policy. For example, the candidate intra-stage data flow policy corresponding to a lowest execution cost may be determined as the intra-stage data flow policy corresponding to the pipeline stage.

In some embodiments of this disclosure, the candidate data flow policies for the operators are combined to obtain a plurality of candidate intra-stage data flow policies based on the operators included in the pipeline stage, then intra-stage execution costs of the candidate intra-stage data flow policies are determined based on the data processing costs of the candidate data flow policies included in the candidate intra-stage data flow policies, and then the intra-stage data flow policy for the pipeline stage is selected from the candidate intra-stage data flow policies based on the intra-stage execution cost of each candidate intra-stage data flow policy, to ensure that the determined intra-stage data flow policy has a low execution cost, thereby quickly obtaining a target intra-stage data flow policy and improving the efficiency of generating the data flow policy.

In some embodiments, the candidate data flow policies include one of the following:

(i) a policy of splitting the operator into a plurality of micro operators based on a spatial dimension, where the plurality of micro operators obtained by splitting based on the spatial dimension are executed in parallel;

(ii) a policy of splitting the operator into a plurality of micro operators based on a temporal dimension, where at least some of the micro operators obtained by splitting based on the temporal dimension are executed in serial; and (iii) a policy of splitting the operator into a plurality of micro operators based on the spatial dimension and the temporal dimension.

The candidate data flow policies include an operator splitting policy, which is a policy of splitting an operator into a plurality of micro operators. In terms of an operator splitting dimension, the operator splitting policy may be the policy of splitting the operator into a plurality of micro operators based on the spatial dimension, the policy of splitting the operator into a plurality of micro operators based on the temporal dimension, or the policy of splitting the operator into a plurality of micro operators base on the spatial dimension and the temporal dimension.

When the operator is split into a plurality of micro operators based on the spatial dimension, no data or control dependency exists between the plurality of micro operators obtained by splitting, and the micro operators may be executed in parallel. For example, OP0 is split into OP01, OP02, and OP03. No data or control dependency exists among OP01, OP02, and OP03, and OP01, OP02, and OP03 may perform data processing in parallel based on input data respectively. As shown in FIG. 4, data parallel is an operator parallel manner of splitting an operator into a plurality of micro operators based on the spatial dimension. OP0, OP1, and OP2 in FIG. 4 are three micro operators obtained by splitting an operator based on the spatial dimension.

When an operator is split into a plurality of micro operators based on the temporal dimension, data or control dependency exists among at least some of the micro operators obtained by splitting. Therefore, at least some of the micro operators obtained by splitting are executed sequentially in serial. For example, if OP0 is split into OP01, OP02, OP03, and OP04, data or control dependency exists between OP02, OP03, and OP03 and OP01. In this case, OP02, OP03, and OP04 may be executed only after OP01 outputs an execution result. In other words, OP01 and OP02, OP01 and OP03, and OP01 and OP04 are all executed in serial. As shown in FIG. 5, model parallel is an operator parallel manner of splitting an operator into a plurality of micro operators based on the temporal dimension. OP0, OP1, OP2, and OP3 in FIG. 5 are four micro operators obtained by splitting an operator based on the temporal dimension.

In addition to splitting the operator based on the spatial dimension or the temporal dimension alone, splitting the operator based on the spatial dimension and the temporal dimension is also allowed. Some of the micro operators obtained by splitting may be executed in parallel, while others may be executed in sequence. For example, OP0 is split into OP01, OP02, OP03, OP04, and OP05.0.0, OP02, and OP03 may be executed in parallel, while OP03, OP04, and OP05 are executed in sequence.

In some embodiments of this disclosure, the candidate data flow policies of the operator may include the policy of splitting the operator based on the spatial dimension, the policy of splitting the operator based on the temporal dimension, or the policy of splitting the operator based on the spatial dimension and the temporal dimension, to obtain a plurality of micro operators that may be executed in parallel, in serial, or in parallel and serial, so that diverse candidate data flow policies may be generated, and a target intra-stage data flow policy that meet the requirements may be generated based on the candidate data flow policies. This improves a success rate of generating the data flow policy.

In some embodiments, after the target inter-stage data flow policy and a plurality of corresponding target intra-stage data flow policies are obtained, an inter-stage communication primitive between the pipeline stages may be generated based on the target inter-stage data flow policy, and intra-stage communication primitives within the corresponding pipeline stages may be generated based on the target intra-stage data flow policies.

Because different tensor segmenting policies may be used in different pipeline stages, a segmenting policy for a tensor outputted by a pre-order pipeline stage may be different from a segmenting policy for a tensor inputted into a post-order pipeline stage. If the segmenting policy for the inputted tensor does not adapt to the pipeline stage, an incorrect operation result may occur. To this end, the inter-stage communication primitive between the pipeline stages is generated based on the target inter-stage data flow policy, and the tensor outputted by the pre-order pipeline stage is segmented through the inter-stage communication primitive, and is then inputted into the post-order pipeline stage, to ensure that the segmenting policy for the tensor inputted into the post-order pipeline stage adapts to the post-order pipeline stage, thereby ensuring a correct operation result of the pipeline stage.

In a same pipeline stage, different tensor segmenting policies may be used for different operators, and different tensor segmenting policies may be used for different micro operators. Therefore, a segmenting policy for a tensor outputted by a pre-order operator may be different from a segmenting policy for a tensor inputted into a post-order operator, and a segmenting policy for a tensor outputted by a pre-order micro operator may be different from a segmenting policy for a tensor inputted into a post-order micro operator. If the segmenting policy for the inputted tensor does not adapt to the operator/micro operator, an incorrect operation result may occur. To this end, intra-stage communication primitives between the operators/micro operators are generated based on the target intra-stage data flow policies, and the tensor outputted by the pre-order operator/micro operator is segmented through the intra-stage communication primitives, and is then inputted into the post-order operator/micro operator, to ensure that the segmenting policy for the tensor inputted into the post-order operator/micro operator adapts to the post-order operator/micro operator, thereby ensuring an accurate operation result of the operator/micro operator.

After the inter-stage communication primitive and the intra-stage communication primitives are generated, the inter-stage communication primitive and the intra-stage communication primitives may be attached to the target inter-stage data flow policy and the plurality of corresponding intra-stage data flow polices, to generate the data flow policy corresponding to the data processing task. Then the data flow policy may be compiled into a machine-executable program through a compiler, and the machine-executable program may be deployed to hardware for running, to implement the execution of the data processing task.

In some embodiments, during generation of the data flow policy, the intra-stage data flow policies may be optimized through an intra-stage optimizer, and the inter-stage data flow policy may be optimized through an inter-stage optimizer. A process of generating a data flow policy through the intra-stage optimizer and the inter-stage optimizer is described below through an example.

Figure 8:
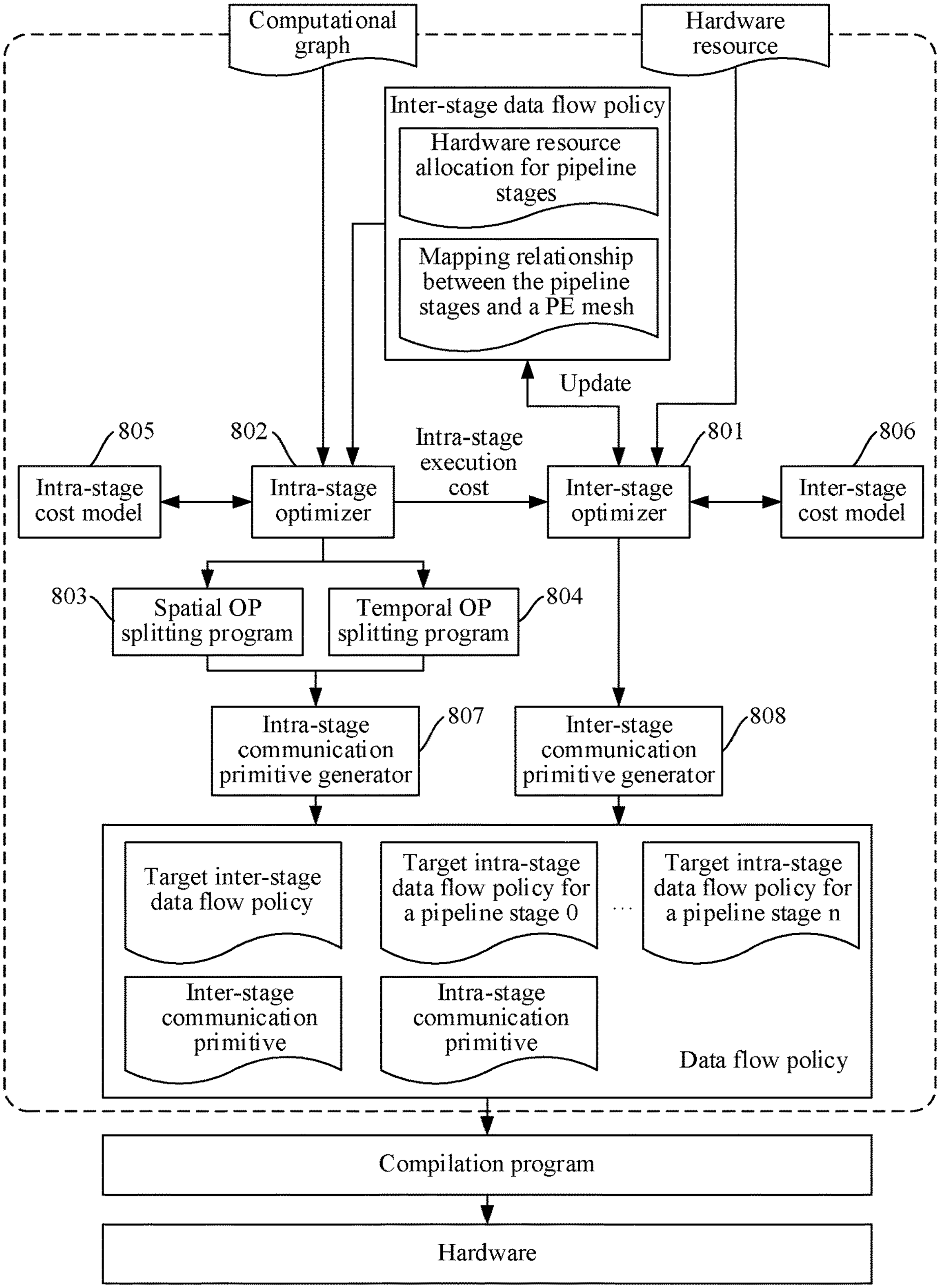
FIG. 8 is a schematic diagram illustrating an exemplary process of generating a data flow policy according to some embodiments of this disclosure.

FIG. 8 is a schematic diagram illustrating an exemplary process of generating a data flow policy according to some embodiments of this disclosure. During a first round of optimization, an inter-stage optimizer 801 can generate an inter-stage data flow policy based on a computational graph and a hardware resource, and send the inter-stage data flow policy to an intra-stage optimizer 802. Intra-stage optimizer 802 calls a spatial OP splitting program 803 and a temporal OP splitting program 804 to split an operator in a pipeline stage based on the inter-stage data flow policy, generates a plurality of intra-stage data flow policies based on a splitting result, calls an intra-stage cost model 805 to calculate an intra-stage execution cost of each of the intra-stage data flow policies, and sends the calculated intra-stage execution cost to inter-stage optimizer 801. Spatial OP splitting program 803 is configured to split the operator into micro operators based on a spatial dimension, and temporal OP splitting program 804 is configured to split the operator into micro operators based on a temporal dimension.

During an $i^{th}$ round of optimization, where i is a positive integer greater than or equal to 2, inter-stage optimizer 801 calls an inter-stage cost model 806 to calculate an inter-stage execution cost based on an intra-stage execution cost received from an $(i-1)^{th}$ round of optimization, then generates a new inter-stage data flow policy based on the computational graph, the hardware resource, and the calculated inter-stage execution cost, and sends the inter-stage data flow policy to intra-stage optimizer 802. Intra-stage optimizer 802 performs the same processing as that in the first round based on the newly received inter-stage data flow policy, generates new intra-stage data flow policies, and sends an intra-stage execution cost of the new intra-stage data flow policies to inter-stage optimizer 801.

If an inter-stage execution cost converges or a task execution time is less than a target duration after a plurality of rounds of optimization of the inter-stage data flow policy and the intra-stage data flow policies based on the optimization manner of the $i^{th}$ round of optimization process, the inter-stage data flow policy at this time is determined as a target inter-stage data flow policy, and a plurality of intra-stage data flow policies at this time are determined as target intra-stage data flow policies.

Intra-stage communication primitives within the pipeline stages are generated through an intra-stage communication primitive generator 807 based on the target intra-stage data flow policies. An inter-stage communication primitive between the pipeline stages is generated through an inter-stage communication primitive generator 808 based on the target inter-stage data flow policy. The intra-stage communication primitives and the inter-stage communication primitive are attached to the target intra-stage data flow policies and the target inter-stage data flow policy to obtain the data flow policy. The data flow policy is compiled into a machine-executable program through a compile program, and the machine-executable programs deployed to hardware for running, to implement execution of a data processing task.

It is to be noted that decisions of inter-stage optimizer 801 may be optimized through appropriate algorithms, such as a genetic algorithm, a dynamic programming algorithm, and a reinforcement learning algorithm.

Figure 9:
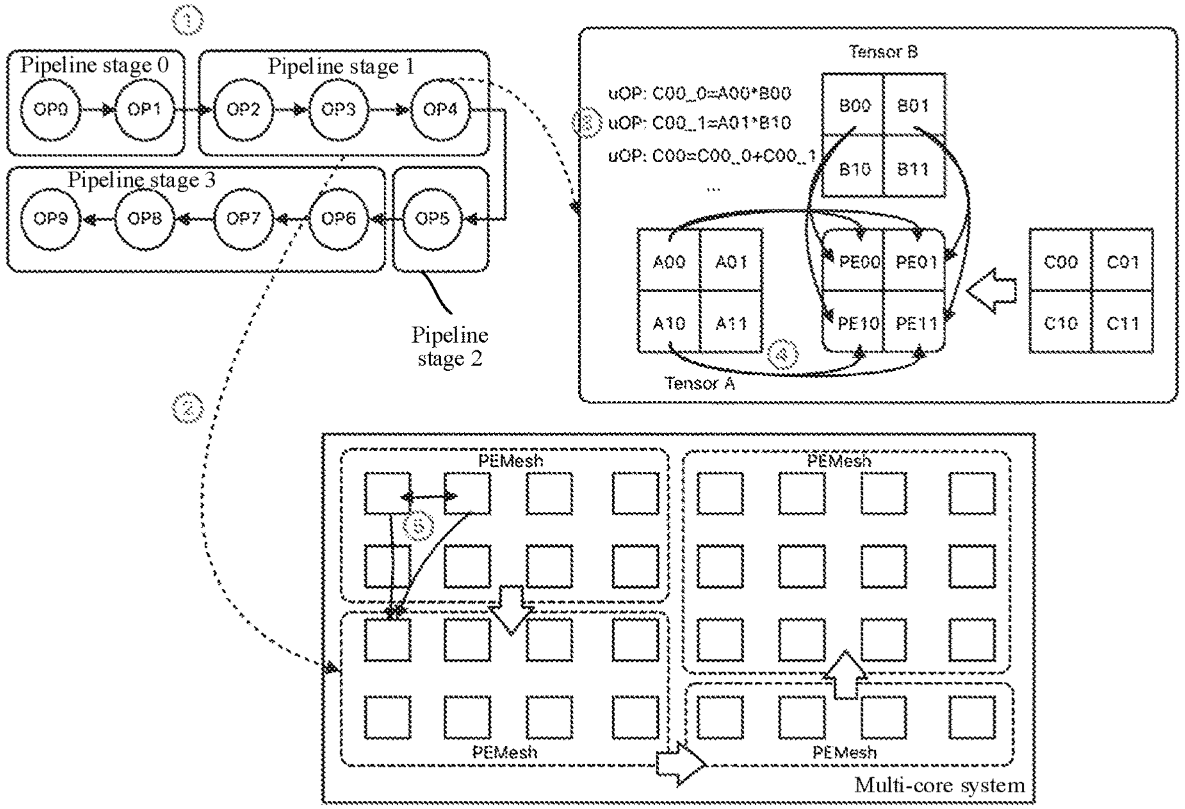
FIG. 9 is a schematic diagram illustrating an exemplary process of generating a data flow policy according to some embodiments of this disclosure.

FIG. 9 is a schematic diagram illustrating an exemplary process of generating a data flow policy according to some embodiments of this disclosure. As shown in FIG. 9, steps ① and ② belong to an inter-stage optimization process, and steps ③, ④ and ⑤ belong to an intra-stage optimization process.

Step ① shows a step of assigning operators to pipeline stages.

Step ② shows a step of splitting a PE mesh and mapping the pipeline stages to the PE mesh.

Step ③ shows a step of splitting an operator (OP) into micro operators (uOP) and mapping the micro operators (uOP) to PEs.

Step ④ shows a step of segmenting a tensor into micro tensors and orchestrating the micro tensors.

Step ⑤ shows a step of orchestrating communication between the PEs, that is, a step of inserting an inter-stage communication primitive or intra-stage communication primitives between the PEs.

In the example shown in step ③, the operator configured to perform matrix multiplication is split into a plurality of micro operators (uOP). A micro operator C00_0=A00*B00 means that a product of an element A00 in a tensor A and an element B00 in a tensor B is calculated, a micro operator C00_1=A01*B10 means that a product of an element A01 in the tensor A and an element B10 in the tensor B is calculated, and a micro operator C00_0=A00*B00 means a sum of C00_0 and C00_1 is calculated. The elements tensor A and tensor B may be referred to as micro tensors.

In the example shown in step ④, the element A00 in the tensor A is orchestrated as inputs of PE00 and PE01, the element A10 in the tensor A is orchestrated as inputs of PE10 and PE11, the element B00 in the tensor B is orchestrated as inputs of PE00 and PE10, and the element B01 in the tensor B is orchestrated as inputs of PE01 and PE11.

Figure 10:
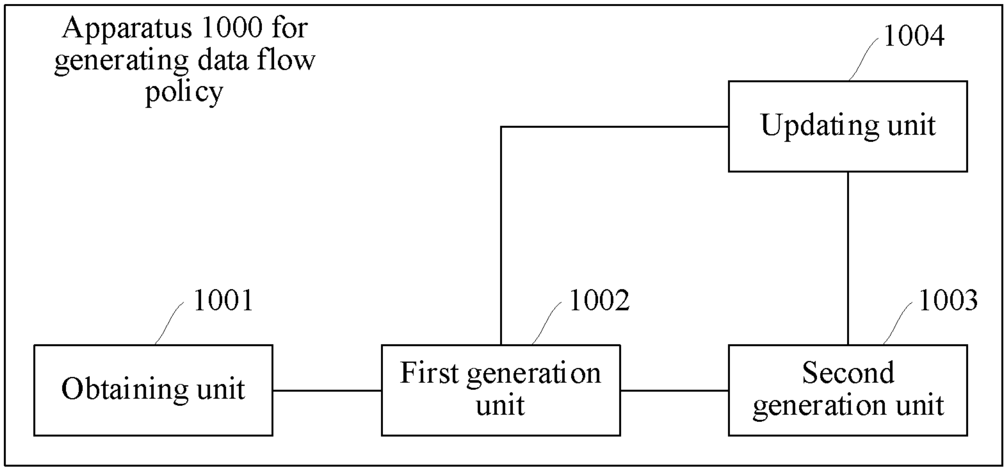
FIG. 10 is a schematic diagram of an exemplary apparatus for generating a data flow policy according to some embodiments of this disclosure.

Corresponding to some of the above method embodiments, FIG. 10 is a schematic diagram of an exemplary apparatus 1000 for generating a data flow policy according to some embodiments of this disclosure. As shown in FIG. 10, an apparatus 1000 for generating a data flow policy includes:

- an obtaining unit 1001, configured to obtain a computational graph corresponding to a data processing task;
- a first generation unit 1002, configured to generate an inter-stage data flow policy based on the computational graph and an execution cost, where the inter-stage data flow policy includes a policy of assigning operators included in the computational graph to a plurality of pipeline stages, and each of the pipeline stages includes at least one operator;
- a second generation unit 1003, configured to generate a plurality of intra-stage data flow policies corresponding to the plurality of pipeline stages based on the inter-stage data flow policy; and
- an updating unit 1004, configured to update the execution cost based on the plurality of intra-stage data flow policies, to optimize the inter-stage data flow policy and obtain a target inter-stage data flow policy and a plurality of corresponding target intra-stage data flow policies for executing the data processing task.

In some embodiments of this disclosure, the data flow policy includes the inter-stage data flow policy and the plurality of intra-stage data flow policies, first generation unit 1002 may determine the inter-stage data flow policy based on the computational graph and the execution cost, second generation unit 1003 may determine the intra-stage data flow policies based on the inter-stage data flow policy, the updating unit 1004 may update the execution cost based on the intra-stage data flow policies to achieve optimization of the inter-stage data flow policy, and second generation unit 1003 generates new intra-stage data flow policies based on the optimized inter-stage data flow policy. The data flow policy for the data processing task may be obtained by repeating the above optimization process. The data flow policy includes the target inter-stage data flow policy and the plurality of corresponding target intra-stage data flow policies. In this way, automated generation of the data flow policy is achieved. The data flow policy is applicable to different data processing tasks and hardware resources, and has high applicability.

It is to be noted that, the apparatus for generating a data flow policy in some embodiments is configured to implement the corresponding method for generating a data flow policy in some of the above method embodiments, and has the beneficial effects of the corresponding method embodiments. Details are not described herein.

Figure 11:
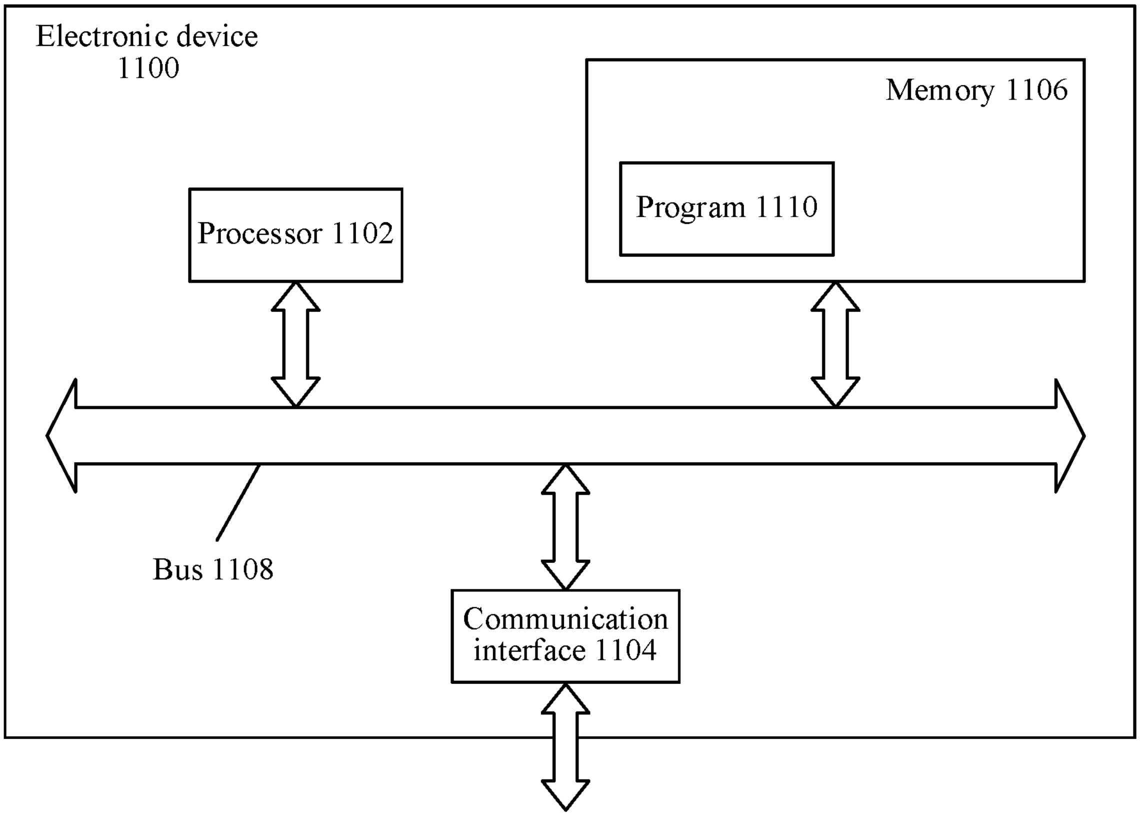
FIG. 11 is a schematic diagram of an exemplary electronic device according to some embodiments of this disclosure.

FIG. 11 is a schematic diagram of an exemplary electronic device 1100 according to some embodiments of this disclosure. Specific implementation of the electronic device is not limited in one of specific embodiments of this disclosure. As shown in FIG. 11, the electronic device 1100 may include a one or more processors 1102 (which can include a CPU and at least one hardware accelerator processor such as a GPU)), a communication interface 1104, a memory 1106, and a communication bus 1108.

Processor 1102, communication interface 1104, and memory 1106 communicate with each other through communication bus 1108.

Communication interface 1104 is configured to communicate with another electronic device or a server.

Processor 1102 is configured to execute a program 1110, and specifically, may perform the corresponding steps in any of the above embodiments of the method for generating a data flow policy.

Specifically, program 1110 may include program code. The program code includes computer operating instructions.

Processor 1102 may be a central processing unit (CPU), a graphics processing unit (GPU), a neural processing unit (NPU), an infrastructure processing unit (IPU), or an application specific integrated circuit (ASIC), or one or more integrated circuits configured to implement some embodiments of this disclosure. One or more processors included in electronic device 1100 may be a same type of processor, such as one or more CPUs, or may be different types of processors, such as one or more CPUs and one or more ASICs.

RISC-V is an open-source instruction set architecture based on the principle of a reduced instruction set computer (RISC), which may be applied to various aspects such as microcontrollers and FPGA chips. Specifically, RISC-V may be applied in fields such as Internet of Things (IoT) security, industrial control, mobile phones, and personal computers. Moreover, because practical requirements such as a small size, a high speed, and a low power consumption were considered when the RISC-V was designed, the RISC-V is particularly suitable for modern computing devices such as warehouse-scale cloud computers, high-end mobile phones, and miniature embedded systems. With the rise of artificial intelligence IoT (AIoT), the RISC-V instruction set architecture gets increasing attention and support, and is expected to be a next-generation widely used CPU architecture.

The computer operating instructions in some embodiments of this disclosure may be computer operating instructions based on the RISC-V instruction set architecture. Correspondingly, processor 1102 may be designed based on the RISC-V instruction set. Specifically, a chip of the processor in the electronic device 1100 provided in some embodiments of this disclosure may be a chip designed using the RISC-V instruction set. The chip may execute executable code based on configured instructions, thereby implementing the method for generating a data flow policy in the above embodiments.

Memory 1106 is configured to store program 1110. Memory 1106 may include a high-speed RAM memory, and may further include a non-volatile memory, such as at least one disk memory.

Program 1110 may be specifically configured to enable processor 1102 to perform the method for generating a data flow policy in any of the above embodiments.

Possible implementations of steps implemented according to program 1110 may refer to the corresponding description in the steps in some of the embodiments of the method for generating a data flow policy. Details are not described herein. It is appreciated that, for ease and brevity of description, for a specific working process of the device and the module described above, refer to the description of the corresponding process in some of the above method embodiments. Details are not described herein.

According to the electronic device in some embodiments of this disclosure, the data flow policy includes the inter-stage data flow policy and the plurality of intra-stage data flow policies, the inter-stage data flow policy may be determined based on the computational graph and the execution cost, the intra-stage data flow policies may be determined based on the inter-stage data flow policy, the execution cost may be updated based on the intra-stage data flow policies to achieve optimization of the inter-stage data flow policy, and new intra-stage data flow policies may be generated based on the optimized inter-stage data flow policy. The data flow policy for the data processing task may be obtained by repeating the above optimization process. The data flow policy includes the target inter-stage data flow policy and the plurality of corresponding target intra-stage data flow policies. In this way, automated generation of the data flow policy is achieved. The data flow policy is applicable to different data processing tasks and hardware resources, and has high applicability.

Some embodiments of this disclosure further provide a non-transitory computer-readable storage medium storing instructions for enabling a machine to perform the method for generating a data flow policy described herein. Specifically, a system or an apparatus equipped with a storage medium may be provided. The storage medium stores software program code for implementing functions of any of the above embodiments, and a computer (a CPU or an MPU) of the system or the apparatus is enabled to read and execute the program code stored in the storage medium.

In this case, the program code read from the storage medium may implement the functions of any of the above embodiments. Therefore, the program code and the storage medium storing the program code constitute a part of this disclosure.

Embodiments of the storage medium for providing the program code include a floppy disk, a hard disk, a magneto-optical disk, an optical disk (such as a CD-ROM, a CD-R, a CD-RW, a DVD-ROM, a DVD-RAM, a DVD-RW, and a DVD+RW), a magnetic tape, a non-volatile storage card, and a ROM. In some embodiments, the program code may be downloaded from a server computer through a communication network.

Some embodiments of this disclosure further provide a computer program product, including computer instructions. The computer instructions instruct a computing device to perform the operations corresponding to any of the above plurality of method embodiments.

It is to be noted that, user-related information (including but not limited to user device information and user personal information) and data (including but not limited to sample data for model training, data for analysis, stored data, and displayed data) in some embodiments of this disclosure are all information and data authorized by a user or fully authorized by all parties, and collection, use, and processing of relevant data need to comply with relevant laws, regulations, and standards of relevant countries and regions. Corresponding operation entries are provided for the user to select authorization or rejection.

It should be pointed out that, based on requirements of implementation, the components/steps described in some embodiments of this disclosure may be split into more components/steps, or two or more components/steps or partial operations of the components/steps may be combined into new components/steps to achieve the goal of some embodiments of this disclosure.

The above methods in some embodiments of this disclosure may be implemented in hardware or firmware, or may be implemented as software or computer code that may be stored in a recording medium (such as a CD ROM, a RAM, a floppy disk, a hard disk, or a magneto-optical disk), or may be implemented as computer code downloaded through a network and originally stored in a remote recording medium or a non-transitory machine-readable medium and will be stored in a local recording medium. Therefore, the methods described herein may be processed by software stored in a recording medium using a general-purpose computer, a dedicated processor, or programmable or dedicated hardware (such as an ASIC or an FPGA). It may be understood that a computer, a processor, a microprocessor controller, or programmable hardware includes a storage component (such as a RAM, a ROM, and a flash memory) that may store or receive software or computer code. When the software or the computer code is accessed and executed by the computer, the processor, or the hardware, the methods described herein are implemented. Furthermore, when the general-purpose computer accesses the code for implementing the methods shown herein, execution of the code converts the general-purpose computer into a dedicated computer configured to perform the methods shown herein.

It is to be noted that, user-related information (including but not limited to user device information and user personal information) and data (including but not limited to sample data for model training, data for analysis, stored data, and displayed data) in some embodiments of this disclosure are all information and data authorized by a user or fully authorized by all parties, and collection, use, and processing of relevant data need to comply with relevant laws, regulations, and standards of relevant countries and regions. Corresponding operation entries are provided for the user to select authorization or rejection.

The embodiments may further be described using the following clauses:

1. A method for generating a data flow policy, including:

obtaining a computational graph corresponding to a data processing task;

generating an inter-stage data flow policy based on the computational graph and an execution cost, wherein the inter-stage data flow policy includes a policy of assigning operators included in the computational graph to a plurality of pipeline stages, and each of the plurality of pipeline stages includes at least one operator;

generating a plurality of intra-stage data flow policies each corresponding to one of the plurality of pipeline stages based on the inter-stage data flow policy; and updating the execution cost based on the plurality of intra-stage data flow policies, to optimize the inter-stage data flow policy and obtain a target inter-stage data flow policy and a plurality of corresponding target intra-stage data flow policies for executing the data processing task.

2. The method according to clause 1, wherein updating the execution cost based on the plurality of intra-stage data flow policies includes:

updating the execution cost based on the plurality of intra-stage data flow policies of current; and re-performing, based on the updated execution cost, generating the inter-stage data flow policy based on the computational graph and the execution cost if the updated execution cost does not meet an optimization termination condition, to optimize the inter-stage data flow policy of current; or determining the inter-stage data flow policy of current and the corresponding plurality of intra-stage data flow policies as the target inter-stage data flow policy and the plurality of corresponding target intra-stage data flow policies if the updated execution cost meets the optimization termination condition.

3. The method according to clause 2, wherein the optimization termination condition includes at least one of the following:

(i) the execution cost converges; or (ii) an execution time of the data processing task is less than a duration threshold.

4. The method according to clause 2, wherein updating the execution cost based on the plurality of intra-stage data flow policies of current includes:

determining a plurality of intra-stage execution costs each corresponding to one of the plurality of intra-stage data flow policies of current; and updating the execution cost based on the plurality of intra-stage execution costs.

5. The method according to any of clauses 1 to 4, wherein the execution cost includes a hardware resource and a task execution time, the inter-stage data flow policy includes a policy of splitting the hardware resource into a plurality of processing element groups and a policy of mapping the plurality of pipeline stages to the plurality of processing element groups, and each of the processing element groups includes at least one processing element.

6. The method according to clause 5, wherein at least one of the following is an updatable item: the hardware resource or the task execution time.

7. The method according to any of clauses 1 to 6, wherein generating the plurality of intra-stage data flow policies each corresponding to one of the plurality of pipeline stages based on the inter-stage data flow policy includes:

generating a plurality of candidate data flow policies for the operator based on the inter-stage data flow policy, wherein the candidate data flow policies include a policy of splitting the operator into a plurality of micro operators, a policy of segmenting a tensor of the operator into a plurality of micro tensors, and a policy of mapping the micro operators to processing elements;

determining data processing costs of the plurality of candidate data flow policies; and determining an intra-stage data flow policy for the pipeline stage based on the data processing costs of the plurality of candidate data flow policies for the operator in the pipeline stage, wherein the intra-stage data flow policy includes at least one candidate data flow policy.

8. The method according to clause 7, wherein determining the intra-stage data flow policy for the pipeline stage includes:

generating a plurality of candidate intra-stage data flow policies for the pipeline stage based on the operator included in the pipeline stage and the plurality of candidate data flow policies for the operator, wherein candidate data flow policies included in different candidate intra-stage data flow policies are at least partially different; and determining the intra-stage data flow policy for the pipeline stage from the plurality of candidate intra-stage data flow policies based on the data processing costs of the candidate data flow policies included in the candidate intra-stage data flow policies.

9. The method according to clause 7, wherein the candidate data flow policies include one of the following:

(i) a policy of splitting the operator into a plurality of micro operators based on a spatial dimension, wherein the plurality of micro operators obtained by splitting based on the spatial dimension are executed in parallel;

(ii) a policy of splitting the operator into a plurality of micro operators based on a temporal dimension, wherein at least some of the micro operators obtained by splitting based on the temporal dimension are executed in serial; or (iii) a policy of splitting the operator into a plurality of micro operators based on the spatial dimension and the temporal dimension.

10. The method according to any of clauses 1 to 9, further including:

generating an inter-stage communication primitive between the pipeline stages based on the target inter-stage data flow policy; and generating intra-stage communication primitives within corresponding pipeline stages based on the target intra-stage data flow policies.

11. An apparatus for generating a data flow policy, including:

an obtaining unit configured to obtain a computational graph corresponding to a data processing task;

a first generation unit configured to generate an inter-stage data flow policy based on the computational graph and an execution cost, wherein the inter-stage data flow policy includes a policy of assigning operators included in the computational graph to a plurality of pipeline stages, and each of the pipeline stages includes at least one operator;

a second generation unit configured to generate a plurality of intra-stage data flow policies each corresponding to one of the plurality of pipeline stages based on the inter-stage data flow policy; and an updating unit configured to update the execution cost based on the plurality of intra-stage data flow policies, to optimize the inter-stage data flow policy and obtain a target inter-stage data flow policy and a plurality of corresponding target intra-stage data flow policies for executing the data processing task.

12. An electronic device including one or more processors, a memory, a communication interface, and a communication bus, wherein the one or more processors, the memory, and the communication interface are configured to communicate with each other through the communication bus, and the memory is further configured to store instructions that are executable by the one or more processors to cause the electronic device to perform the method according to any of clauses 1 to 10.

13. A non-transitory computer-readable storage medium storing instructions that are executable by one or more processors of a device to cause the device to perform the method according to any of clauses 1 to 10.

14. A computer program product including computer instructions, wherein the computer instructions instruct a computing device to perform the method according to any of clauses 1 to 10.

It is appreciated that, the units and the steps of the methods described with reference to the embodiments disclosed herein may be implemented by electronic hardware or a combination of computer software and electronic hardware. Whether the functions are performed by hardware or software depends on particular applications and design constraints of the technical solutions. It is appreciated that, different methods can be used to implement the described functions for the particular applications, but it should not be considered that the implementation goes beyond the scope of embodiments of this disclosure.

It is to be noted that, the terms such as "first" and "second" in the specification and claims of this disclosure and the above accompanying drawings are used for distinguishing similar objects but not necessarily used for describing particular order or sequence. It is to be understood that such used data is interchangeable where appropriate so that the examples of this disclosure described here can be implemented in an order other than those illustrated or described here. Moreover, the terms "include", "have" and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is to be understood that the disclosed technical content may be implemented in other ways. The apparatus embodiments described above are only schematic. For example, the division of the units is only a logical function division. In actual implementations, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, units, or modules, which may be in electrical or other forms.

The units described as separate components may or may not be physically separated, and the components displayed as units may or may not be physical units, that is, they may be located in one place or may be distributed to a plurality of network units. Part of or all the units may be selected according to actual needs to achieve the purpose of the solution described in some embodiments of the present disclosure.

In addition, the functional units in various embodiments of the present disclosure may be integrated into one processing unit, or each unit may exist alone physically, or two or more units may be integrated into one unit. The integrated units described above may be implemented either in the form of hardware or in the form of a software functional unit.

If the integrated units are implemented in the form of a software functional unit and sold or used as an independent product, they may be stored in a quantum computer-readable storage medium. Based on such an understanding, the technical solutions of the present disclosure essentially, or the part making contributions to the prior art, or all or part of the technical solutions may be embodied in the form of a software product. The quantum computer software product is stored in a storage medium and includes several instructions used for causing a quantum computer device to execute all or part of steps of the methods in various embodiments of the present disclosure.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for generating a data flow policy, comprising:

obtaining a computational graph corresponding to a data processing task;

generating an inter-stage data flow policy based on the computational graph and an execution cost, wherein the inter-stage data flow policy comprises a policy of assigning operators comprised in the computational graph to a plurality of pipeline stages, and each of the plurality of pipeline stages comprises at least one operator;

generating a plurality of intra-stage data flow policies corresponding to the plurality of pipeline stages based on the inter-stage data flow policy; and updating the execution cost based on the plurality of intra-stage data flow policies, to improve the inter-stage data flow policy and obtain a target inter-stage data flow policy and a plurality of corresponding target intra-stage data flow policies for executing the data processing task.

2. The method according to claim 1, wherein updating the execution cost based on the plurality of intra-stage data flow policies comprises:

updating the execution cost based on the plurality of intra-stage data flow policies of current; and re-performing, based on the updated execution cost, generating the inter-stage data flow policy based on the computational graph and the execution cost if the updated execution cost does not meet a termination condition, to improve the inter-stage data flow policy of current; or determining the inter-stage data flow policy of current and the corresponding plurality of intra-stage data flow policies as the target inter-stage data flow policy and the plurality of corresponding target intra-stage data flow policies if the updated execution cost meets the termination condition.

3. The method according to claim 2, wherein the termination condition comprises at least one of the following:

(i) the execution cost converges; or (ii) an execution time of the data processing task is less than a duration threshold.

4. The method according to claim 2, wherein updating the execution cost based on the plurality of intra-stage data flow policies of current comprises:

determining a plurality of intra-stage execution costs corresponding to the plurality of intra-stage data flow policies of current; and updating the execution cost based on the plurality of intra-stage execution costs.

5. The method according to claim 1, wherein the execution cost comprises a hardware resource and a task execution time, the inter-stage data flow policy comprises a policy of splitting the hardware resource into a plurality of processing element groups and a policy of mapping the plurality of pipeline stages to the plurality of processing element groups, and each of the processing element groups comprises at least one processing element.

6. The method according to claim 5, wherein at least one of the following is an updatable item: the hardware resource or the task execution time.

7. The method according to claim 1, wherein generating the plurality of intra-stage data flow policies corresponding to the plurality of pipeline stages based on the inter-stage data flow policy comprises:

generating a plurality of candidate data flow policies for the operator based on the inter-stage data flow policy, wherein the candidate data flow policies comprise a policy of splitting the operator into a plurality of micro operators, a policy of segmenting a tensor of the operator into a plurality of micro tensors, and a policy of mapping the micro operators to processing elements;

determining data processing costs of the plurality of candidate data flow policies; and determining an intra-stage data flow policy for the pipeline stage based on the data processing costs of the plurality of candidate data flow policies for the operator in the pipeline stage, wherein the intra-stage data flow policy comprises at least one candidate data flow policy.

8. The method according to claim 7, wherein determining the intra-stage data flow policy for the pipeline stage comprises:

generating a plurality of candidate intra-stage data flow policies for the pipeline stage based on the operator comprised in the pipeline stage and the plurality of candidate data flow policies for the operator, wherein candidate data flow policies comprised in different candidate intra-stage data flow policies are at least partially different; and determining the intra-stage data flow policy for the pipeline stage from the plurality of candidate intra-stage data flow policies based on the data processing costs of the candidate data flow policies comprised in the candidate intra-stage data flow policies.

9. The method according to claim 7, wherein the candidate data flow policies comprise one of the following:

(i) a policy of splitting the operator into a plurality of micro operators based on a spatial dimension, wherein the plurality of micro operators obtained by splitting based on the spatial dimension are executed in parallel;

(ii) a policy of splitting the operator into a plurality of micro operators based on a temporal dimension, wherein at least some of the micro operators obtained by splitting based on the temporal dimension are executed in serial; or (iii) a policy of splitting the operator into a plurality of micro operators based on the spatial dimension and the temporal dimension.

10. The method according to claim 1, further comprising:

generating an inter-stage communication primitive between the pipeline stages based on the target inter-stage data flow policy; and generating intra-stage communication primitives within corresponding pipeline stages based on the target intra-stage data flow policies.

11. An electronic device, comprising one or more processors, a memory, a communication interface, and a communication bus, wherein the one or more processors, the memory, and the communication interface are configured to communicate with each other through the communication bus; and the memory is configured to store instructions that are executable by the one or more processors to cause the electronic device to perform operations for generating a data flow policy, the operations comprising:

obtaining a computational graph corresponding to a data processing task;

generating an inter-stage data flow policy based on the computational graph and an execution cost, wherein the inter-stage data flow policy comprises a policy of assigning operators comprised in the computational graph to a plurality of pipeline stages, and each of the plurality of pipeline stages comprises at least one operator;

generating a plurality of intra-stage data flow policies corresponding to the plurality of pipeline stages based on the inter-stage data flow policy; and updating the execution cost based on the plurality of intra-stage data flow policies, to improve the inter-stage data flow policy and obtain a target inter-stage data flow policy and a plurality of corresponding target intra-stage data flow policies for executing the data processing task.

12. The device according to claim 11, wherein updating the execution cost based on the plurality of intra-stage data flow policies comprises:

updating the execution cost based on the plurality of intra-stage data flow policies of current; and re-performing, based on the updated execution cost, generating the inter-stage data flow policy based on the computational graph and the execution cost if the updated execution cost does not meet a termination condition, to improve the inter-stage data flow policy of current; or determining the inter-stage data flow policy of current and the corresponding plurality of intra-stage data flow policies as the target inter-stage data flow policy and the plurality of corresponding target intra-stage data flow policies if the updated execution cost meets the termination condition.

13. The device according to claim 12, wherein the termination condition comprises at least one of the following:

(i) the execution cost converges; or (ii) an execution time of the data processing task is less than a duration threshold.

14. The device according to claim 12, wherein updating the execution cost based on the plurality of intra-stage data flow policies of current comprises:

determining a plurality of intra-stage execution costs corresponding to the plurality of intra-stage data flow policies of current; and updating the execution cost based on the plurality of intra-stage execution costs.

15. The device according to claim 11, wherein the execution cost comprises a hardware resource and a task execution time, the inter-stage data flow policy comprises a policy of splitting the hardware resource into a plurality of processing element groups and a policy of mapping the plurality of pipeline stages to the plurality of processing element groups, and each of the processing element groups comprises at least one processing element.

16. The device according to claim 15, wherein at least one of the following is an updatable item: the hardware resource or the task execution time.

17. The device according to claim 11, wherein generating the plurality of intra-stage data flow policies corresponding to the plurality of pipeline stages based on the inter-stage data flow policy comprises:

generating a plurality of candidate data flow policies for the operator based on the inter-stage data flow policy, wherein the candidate data flow policies comprise a policy of splitting the operator into a plurality of micro operators, a policy of segmenting a tensor of the operator into a plurality of micro tensors, and a policy of mapping the micro operators to processing elements;

determining data processing costs of the plurality of candidate data flow policies; and determining an intra-stage data flow policy for the pipeline stage based on the data processing costs of the plurality of candidate data flow policies for the operator in the pipeline stage, wherein the intra-stage data flow policy comprises at least one candidate data flow policy.

18. The device according to claim 17, wherein determining the intra-stage data flow policy for the pipeline stage comprises:

generating a plurality of candidate intra-stage data flow policies for the pipeline stage based on the operator comprised in the pipeline stage and the plurality of candidate data flow policies for the operator, wherein candidate data flow policies comprised in different candidate intra-stage data flow policies are at least partially different; and determining the intra-stage data flow policy for the pipeline stage from the plurality of candidate intra-stage data flow policies based on the data processing costs of the candidate data flow policies comprised in the candidate intra-stage data flow policies.

19. The device according to claim 17, wherein the candidate data flow policies comprise one of the following:

(i) a policy of splitting the operator into a plurality of micro operators based on a spatial dimension, wherein the plurality of micro operators obtained by splitting based on the spatial dimension are executed in parallel;

(ii) a policy of splitting the operator into a plurality of micro operators based on a temporal dimension, wherein at least some of the micro operators obtained by splitting based on the temporal dimension are executed in serial; or (iii) a policy of splitting the operator into a plurality of micro operators based on the spatial dimension and the temporal dimension.

20. A non-transitory computer-readable storage medium storing instructions that are executable by one or more processors of a device to cause the device to perform operations for generating a data flow policy, the operations comprising:

obtaining a computational graph corresponding to a data processing task;

generating an inter-stage data flow policy based on the computational graph and an execution cost, wherein the inter-stage data flow policy comprises a policy of assigning operators comprised in the computational graph to a plurality of pipeline stages, and each of the plurality of pipeline stages comprises at least one operator;

generating a plurality of intra-stage data flow policies corresponding to the plurality of pipeline stages based on the inter-stage data flow policy; and updating the execution cost based on the plurality of intra-stage data flow policies, to improve the inter-stage data flow policy and obtain a target inter-stage data flow policy and a plurality of corresponding target intra-stage data flow policies for executing the data processing task.

* * * * *